United States Patent
Yoshida

(10) Patent No.: US 8,279,326 B2
(45) Date of Patent: Oct. 2, 2012

(54) LIGHT QUANTITY DETECTING APPARATUS AND IMAGING APPARATUS

(75) Inventor: Shinya Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 12/268,512

(22) Filed: Nov. 11, 2008

(65) Prior Publication Data

US 2010/0060779 A1 Mar. 11, 2010

(30) Foreign Application Priority Data

Sep. 9, 2008 (JP) ................................. 2008-230495

(51) Int. Cl.
*H04N 5/232* (2006.01)
(52) U.S. Cl. ........................................ 348/350; 396/121
(58) Field of Classification Search .................. 348/345, 348/350, 353; 396/79, 80, 104, 212, 121; 73/1.42; 714/43, 44
See application file for complete search history.

(56) References Cited

U.S. PATENT DOCUMENTS

| | | | | |
|---|---|---|---|---|
| 5,228,042 A | * | 7/1993 | Gauthier et al. | 714/716 |
| 5,572,280 A | * | 11/1996 | Yaji et al. | 396/96 |
| 5,579,477 A | * | 11/1996 | Ogletree | 714/44 |
| 5,845,155 A | * | 12/1998 | Nakata et al. | 396/96 |
| 6,292,911 B1 | * | 9/2001 | Swanson | 714/715 |
| 6,574,758 B1 | * | 6/2003 | Eccles | 714/712 |
| 6,987,538 B1 | * | 1/2006 | Nakata et al. | 348/345 |
| 7,047,458 B2 | * | 5/2006 | Nejedlo et al. | 714/715 |
| 7,493,034 B2 | * | 2/2009 | Nakata | 396/96 |
| 2006/0168483 A1 | * | 7/2006 | Sherlock et al. | 714/43 |
| 2009/0007633 A1 | * | 1/2009 | Wittschief | 73/23.3 |

FOREIGN PATENT DOCUMENTS

| | | |
|---|---|---|
| JP | 04-203999 | 7/1992 |
| JP | 10-090590 | 4/1998 |
| JP | 2001-305422 | 10/2001 |
| JP | 2002-279565 | 9/2002 |
| JP | 3581031 | 7/2004 |
| JP | 207-333801 | 12/2007 |

OTHER PUBLICATIONS

Japanese Patent Office Action corresponding to Japanese Serial No. 2008-230495 dated Jul. 20, 2010.

* cited by examiner

*Primary Examiner* — Aung S Moe
*Assistant Examiner* — Chriss Yoder, III
(74) *Attorney, Agent, or Firm* — SNR Denton US LLP

(57) ABSTRACT

A light quantity detecting apparatus is disclosed which includes: an integration detection section configured to output a signal that varies with integrated quantities of light received by a light-receiving device; a comparison section configured to compare the signal output by the integration detection section with a reference value in order to output a signal representing a result of the comparison; a dummy signal generation section configured to generate a signal equivalent to the comparison result signal output by the comparison section; a changeover section configured to change the output of the comparison section with the output of the dummy signal generation section in response to a control signal; and an integration signal generation section configured to generate a signal indicating an end of the integration of the quantities of received light in accordance with the signal forwarded via the changeover section.

6 Claims, 11 Drawing Sheets

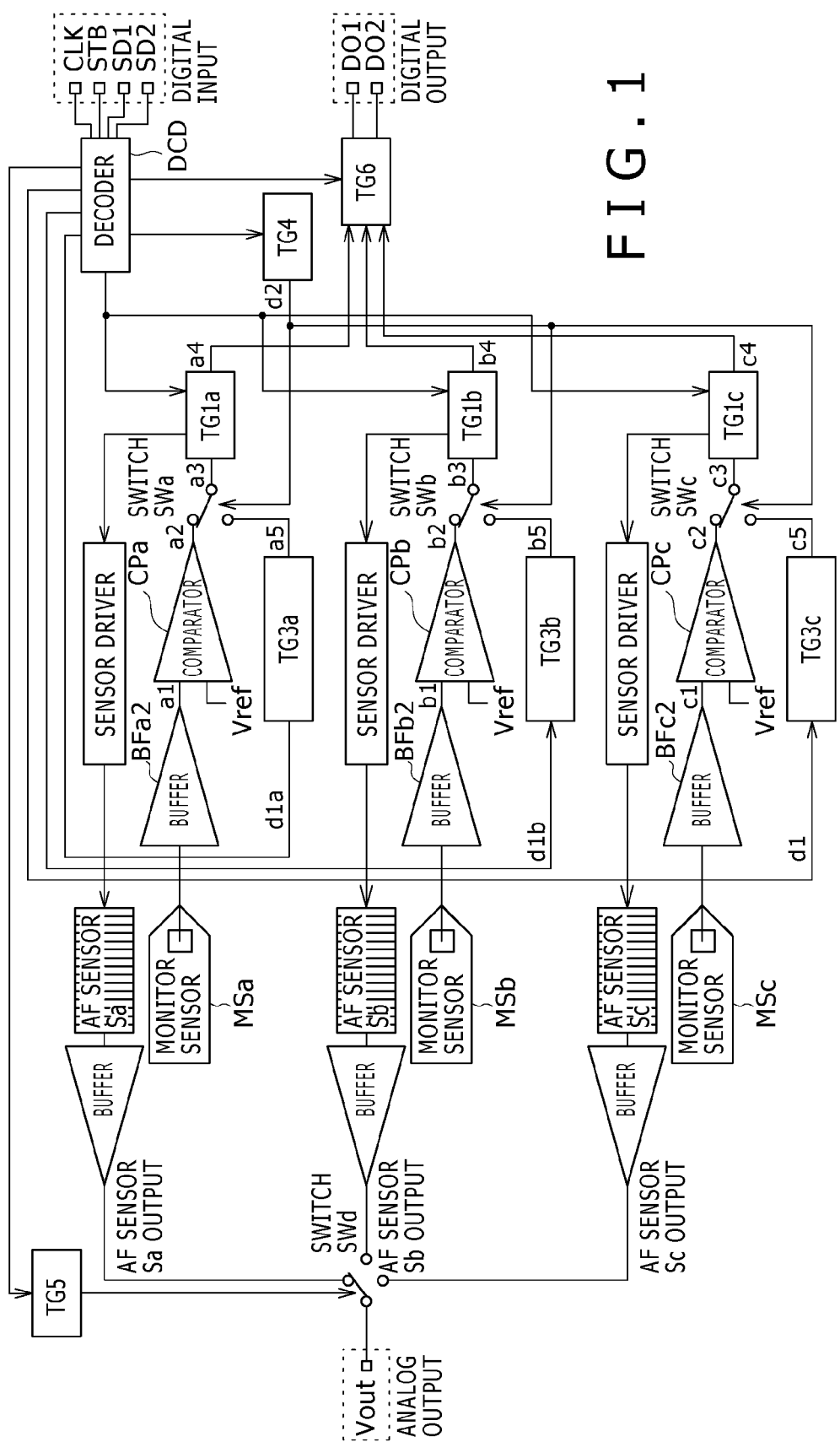
F I G. 1

FIG. 3

| No. | DATA | | | | FUNCTION |
|---|---|---|---|---|---|
| | D1 | D2 | D3 | D4 | |
| 1 | 0 | 0 | 0 | 0 | RESET |
| 2 | 0 | 0 | 0 | 1 | AUTOMATIC INTEGRATION START |
| 3 | 0 | 0 | 1 | 0 | SENSOR a OUTPUT READOUT |
| 4 | 0 | 0 | 1 | 1 | SENSOR b OUTPUT READOUT |
| 5 | 0 | 1 | 0 | 0 | SENSOR c OUTPUT READOUT |
| 6 | 0 | 1 | 0 | 1 | DUMMY COMPARATOR SIGNAL CHANGEOVER SWITCH ON |
| 7 | 0 | 1 | 1 | 0 | DUMMY COMPARATOR SIGNAL CHANGEOVER SWITCH OFF |
| 8 | 0 | 1 | 1 | 1 | SENSOR a FORCED ACCUMULATION END |
| 9 | 1 | 0 | 0 | 0 | SENSOR b FORCED ACCUMULATION END |
| 10 | 1 | 0 | 0 | 1 | SENSOR c FORCED ACCUMULATION END |
| 11 | 1 | 0 | 1 | 0 | INTEGRATION END SEQUENCE INFORMATION READOUT |
| 12 | 1 | 0 | 1 | 1 | (NOT USED) |
| 13 | 1 | 1 | 0 | 0 | (NOT USED) |
| 14 | 1 | 1 | 0 | 1 | (NOT USED) |
| 15 | 1 | 1 | 1 | 0 | (NOT USED) |
| 16 | 1 | 1 | 1 | 1 | (NOT USED) |

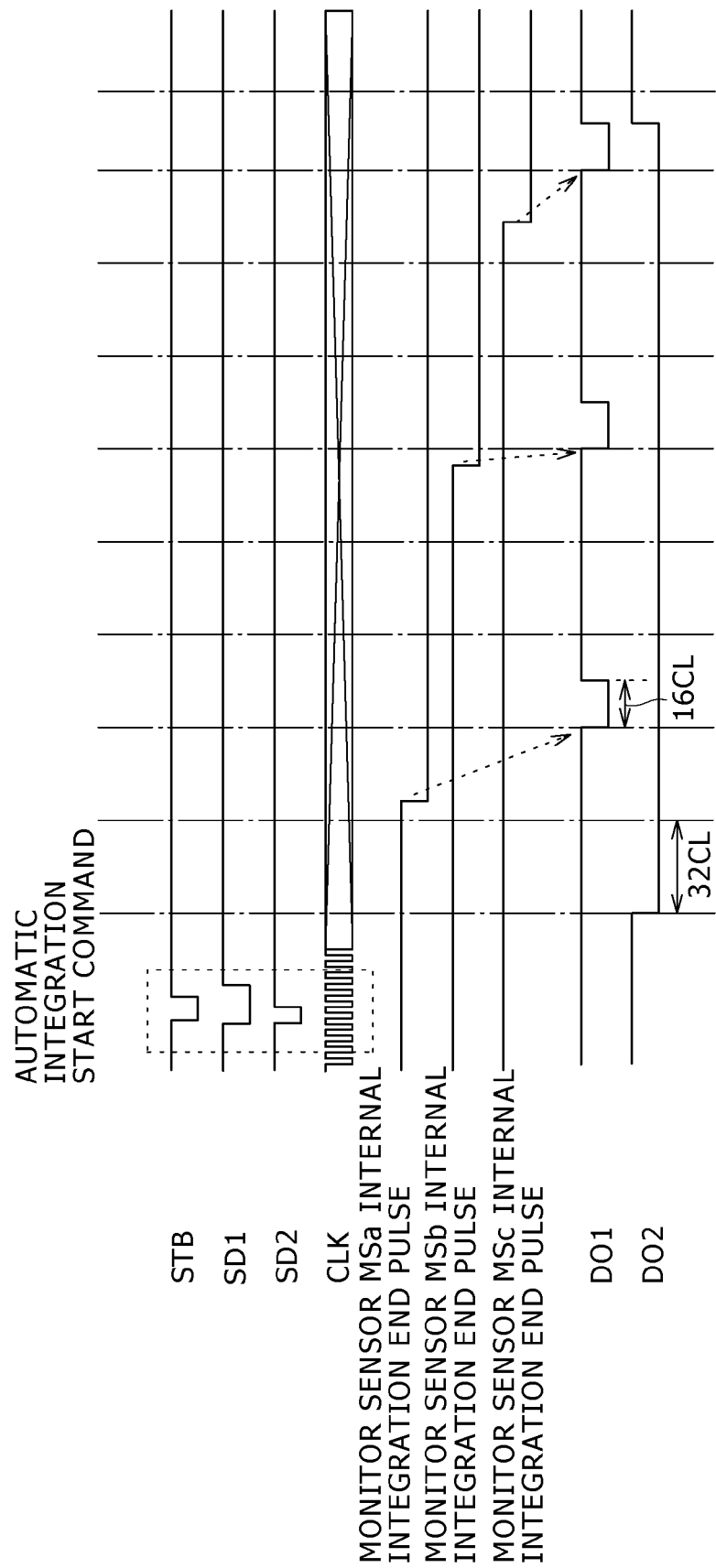

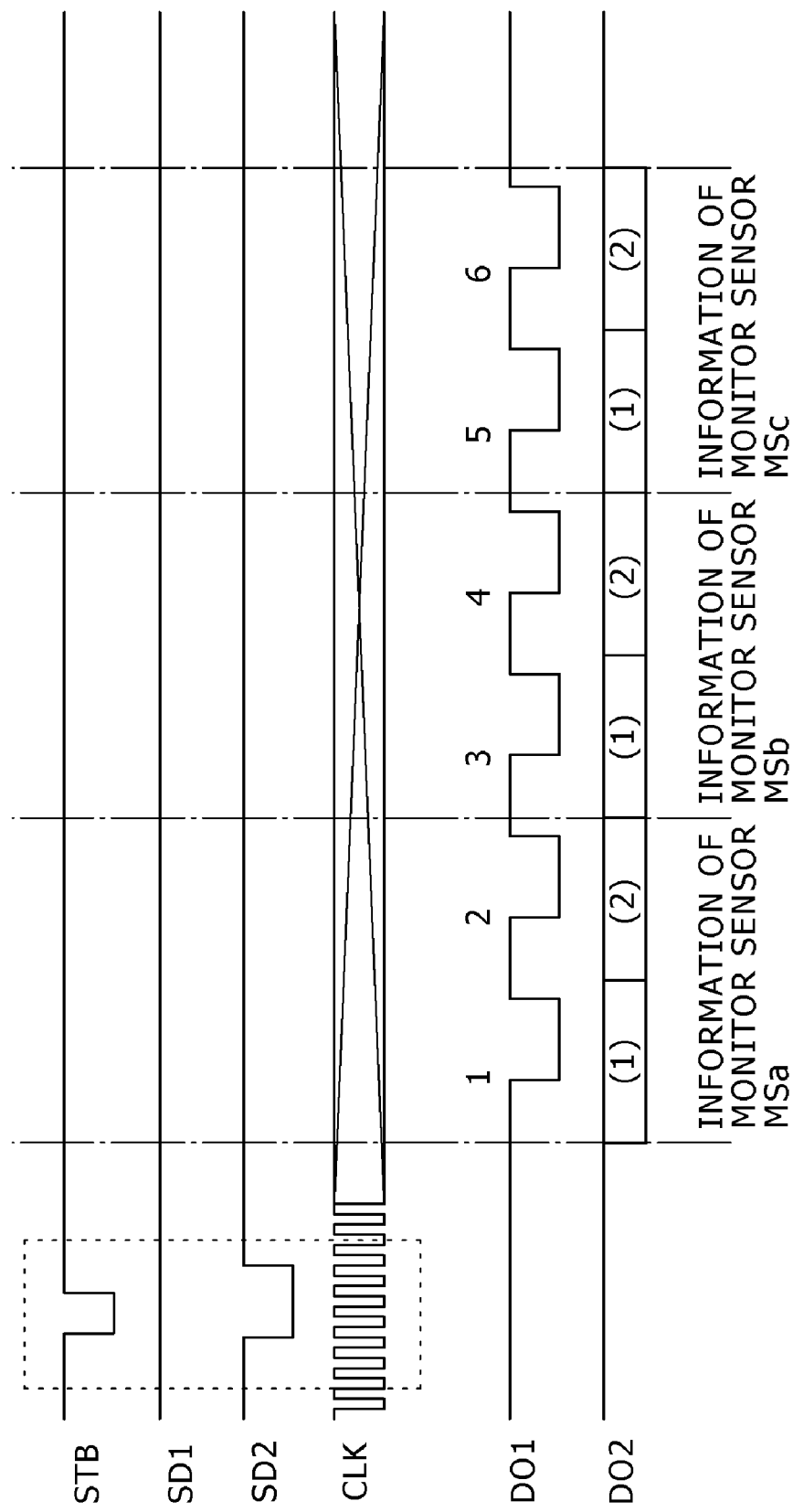

FIG.6

| END SEQUENCE | DO2 | |
| :---: | :---: | :---: |
| | (1) | (2) |
| FIRST | 0 | 0 |
| SECOND | 1 | 0 |
| THIRD | 0 | 1 |
| NOT USED | 1 | 1 |

LIGHT QUANTITY DETECTING APPARATUS AND IMAGING APPARATUS

CROSS REFERENCES TO RELATED APPLICATIONS

The present invention contains subject matter related to Japanese Patent Application JP 2008-230495 filed with the Japan Patent Office on Sep. 9, 2008, the entire contents of which being incorporated herein by reference.

BACKGROUND OF THE INVENTION

1. Field of the Invention

The present invention relates to a light quantity detecting apparatus and an imaging apparatus. More particularly, the invention relates to a light quantity detecting apparatus for detecting a predetermined level of light by integrating the quantities of light received, and to an imaging apparatus utilizing that light quantity detecting apparatus for detecting quantities of light with an autofocus sensor arrangement.

2. Description of the Related Art

The autofocus (AF) sensor arrangement used to implement the automatic lens focusing function is generally made up of a plurality of CCD linear sensors (called AF sensors hereunder). Each of these AF sensors is equipped with the ability to end its light quantity integration on a predetermined output voltage under an integral control scheme. The integral control involves causing a plurality of AF sensors simultaneously to start integrating the quantities of received light and allowing each of the AF sensors to end its integrating process on a predetermined output voltage depending on illumination status. This type of technique is disclosed illustratively in Japanese Patent No. 3581031 and Japanese Published patent Laid-open No. 2001-305422.

Usually, the quantity of incident light varies from one AF sensor to another. That means different AF sensors have different integration end timings. For that reason, each AF sensor has the function of notifying its integration end timing and its integration end sequence information.

Under the above scheme of integral control using CCD linear sensors for autofocus purposes, a monitor sensor is furnished close to each AF sensor configured in order to detect the integrated light quantity of the corresponding AF sensor. For light quantity detection, it is assumed that the integration of the light incident on a given AF sensor is equivalent to the integration of the light incident on the monitor sensor located nearby.

The integral control scheme involving multiple AF sensors requires that the quantity of light be detected with precision by each monitor sensor. During the manufacture of AF-use CCD linear sensors, it is necessary to examine whether the feature of notifying the detected light quantity with each monitor sensor (i.e., automatic integration end timing) normally functions, illustratively with regard to a plurality of CCD linear sensors formed on a wafer before they are packaged.

SUMMARY OF THE INVENTION

There is a particular problem with the process of examining whether or not each monitor sensor notifies accurately its automatic integration end timing and whether or not the sequence information about the automatic integration end timing output by each monitor sensor is accurate. The problem consists of the difficulty in devising a setup that will intentionally cause different monitor sensors to give different automatic integration end timings. For example, if there are three monitor sensors, a different level of illumination needs to be provided for each of the three sensors, e.g., 10 lux for the first monitor sensor, 20 lux for the second monitor sensor, and 30 lux for the third monitor sensor. To have the intensity of illumination changed in that manner from one sensor to another on a single chip requires very complex techniques.

The present invention has been made in view of the above circumstances and provides arrangements for accurately checking the light quantity detecting apparatus for performance without actually emitting different intensities of light thereto.

In carrying out the present invention and according to one embodiment thereof, there is provided a light quantity detecting apparatus including: an integration detection section configured to output a signal that varies with integrated quantities of light received by a light-receiving device; a comparison section configured to compare the signal output by the integration detection section with a reference value in order to output a signal representing a result of the comparison; a dummy signal generation section configured to generate a signal equivalent to the comparison result signal output by the comparison section; a changeover section configured to change the output of the comparison section with the output of the dummy signal generation section in response to a control signal; and an integration signal generation section configured to generate a signal indicating an end of the integration of the quantities of received light in accordance with the signal forwarded via the changeover section.

According to the inventive light quantity detecting apparatus outlined above, the comparison section compares the signal output by the integration detection section with a predetermined reference value and outputs a signal indicative of the result of the comparison. The dummy signal generation section generates a signal equivalent to the comparison result signal. When the changeover section changes the signal from the comparison section with the signal from the dummy signal generation section, the signal equivalent to the comparison result can be sent to the downstream integration signal generation section, with no need for the comparison section to obtain the output from the integration detection section for comparison with the reference value.

Preferably, the light quantity detecting apparatus of the embodiment may further include a plurality of light quantity detection circuit groups each including the integration detection section, comparison section, dummy signal generation section, changeover section, and integration signal generation section; and a control signal generation section configured to generate the control signal for each of the light quantity detection circuit groups in a predetermined sequence, the control signal being used to check the sections downstream of the changeover section for performance. With this preferred structure, the control signals for the light quantity detection circuit groups are forwarded in a predetermined sequence. This causes the changeover sections of the circuit groups to operate in sequence, sending the dummy signal equivalent to the comparison result to each of the integration signal generation sections configured.

Each of the control signals is used to check the sections downstream of the changeover section for performance. With the preferred structure of the invention, the control signal controls the changeover section to effect relevant operations. The light quantity detecting apparatus of the invention may further include an integration signal holding section configured to hold timings of the signal output by the integration signal generation section.

According to another embodiment of the present invention, there is provided an imaging apparatus including: an autofocus sensor configured to be used for automatically focusing a lens arrangement; and a light quantity detection section configured to detect the quantity of light received near the autofocus sensor; wherein the light quantity detection section includes: an integration detection section configured to output a signal that varies with integrated quantities of light received by a light-receiving device; a comparison section configured to compare the signal output by the integration detection section with a reference value in order to output a signal representing a result of the comparison; a dummy signal generation section configured to generate a signal equivalent to the comparison result signal output by the comparison section; a changeover section configured to change the output of the comparison section with the output of the dummy signal generation section in response to a control signal; and an integration signal generation section configured to generate a signal indicating an end of the integration of the quantities of received light in accordance with the signal forwarded via the changeover section. Using the integration end signal, the integration signal generation section controls the autofocus sensor in operation.

According to the inventive imaging apparatus outlined above, the comparison section compares the signal output by the integration detection section in the light quantity detection section with a reference value in order to output the signal indicative of the comparison result. The comparison result signal thus output is used to control the integrating process of the autofocus sensor. Meanwhile, the dummy signal generation section generates a signal equivalent to the comparison result signal output by the comparison section. When the changeover section changes the signal from the comparison section with the signal from the dummy signal generation section, the signal equivalent to the comparison result can be sent to the downstream integration signal generation section for verification of performance, with no need for the comparison section to obtain the output from the integration detection section for comparison with the reference value.

According to the present invention, as outlined above, the suitable arrangement of circuits for integral control over light quantities makes it possible to check the light quantity detecting apparatus for performance without actually emitting light to the integration detection section of the apparatus.

BRIEF DESCRIPTION OF THE DRAWINGS

FIG. 1 is a schematic view showing a typical circuit structure of a light quantity detecting apparatus practiced as one embodiment of the present invention;

FIG. 3 is a tabular view listing typical control codes;

FIG. 4 is a timing chart explanatory of an automatic integration end timing notification function;

FIG. 5 is a timing chart explanatory of an automatic integration end sequence information notification function;

FIG. 6 is a tabular view listing typical end sequence codes;

DETAILED DESCRIPTION OF THE PREFERRED EMBODIMENTS

Figure 2:
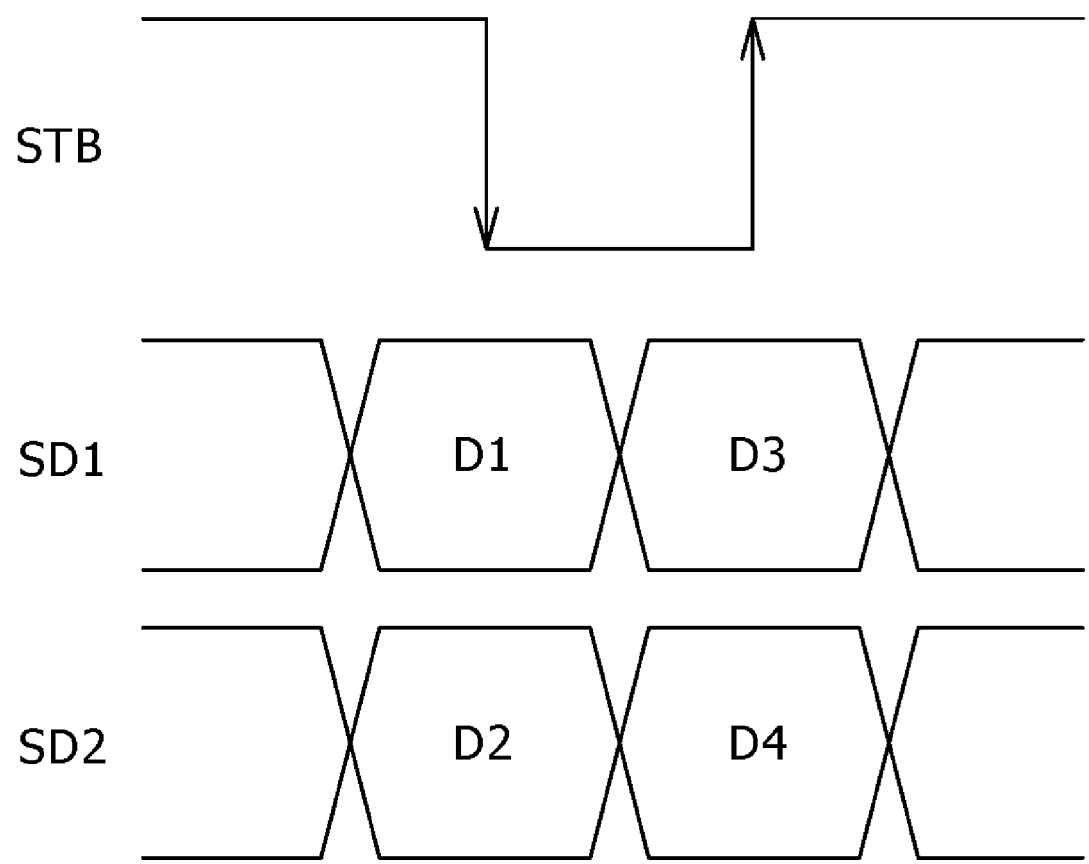
FIG. 2 is a schematic view explanatory of input timings of control codes.

The preferred embodiments of the present invention will now be described in reference to the accompanying drawings under the following headings:

1. Light quantity detecting apparatus
2. Automatic integration end timing notification function
3. Automatic integration end sequence information notification function
4. Automatic integration end control
5. Imaging apparatus
6. Effects of the embodiments <1. Light Quantity Detecting Apparatus>
[Circuit Structure]

FIG. 1 schematically shows a typical circuit structure of a light quantity detecting apparatus practiced as one embodiment of the present invention. This light quantity detecting apparatus embodying the invention is used primarily to have the quantities of incident light detected by AF sensors under integral control. The light quantity detecting apparatus includes monitor sensors (light-receiving devices) MSa, MSb and MSc; buffers (integration detection section) BFa2, BFb2 and BFc2; comparators (comparison section) CPa, CPb and CPc; dummy comparator signal generators (dummy signal generation section) TG3a, TG3b and TG3c; switches (changeover section) SWa, SWb and SWc; and integration signal generators (integration signal generation section) TG1a, TG1b and TG1c.

This embodiment is made up of three light quantity detection circuit groups each formed by the monitor sensor, buffer, comparator, dummy comparator signal generator, switch, and integration signal generator. There may be provided two, or more than three, light quantity detection circuit groups. For purpose of simplification and illustration, this embodiment is assumed to have three light quantity detection circuit groups.

[Structure of a Light Quantity Detection Circuit Group]

This embodiment has three light quantity detection circuit groups as mentioned above, all structured the same. What follows is a description of one light quantity detection circuit group as representative of the three groups, covering the monitor sensor MSa, buffer BFa2, comparator CPa, dummy comparator signal generator TG3a, switch SWa, and integration signal generator TG1a.

The monitor sensor MSa is located near the AF sensor Sa. In operation, the monitor sensor MSa accumulates charges proportional to the quantity of received light. The output line of the monitor sensor MSa is connected to the downstream buffer BFa2. The buffer BFa2 outputs a signal that varies with the signal being integrated and output by the monitor sensor MSa. Specifically, the signal output by the monitor sensor MSa is received by the buffer BFa2. While receiving the signal, the buffer BFa2 outputs a signal that varies depending on the time period in which the signal is being received. In this embodiment, the buffer BFa2 outputs the signal whose output level drops the longer the time period in which the signal is being received from the monitor sensor MSa. The output line of the buffer BFa2 is connected to one of the two inputs of the comparator CPa.

The other input of the comparator CPa admits a predetermined reference value Vref. The reference value Vref is used to determine whether the integrated quantity of light received by the monitor sensor MSa has reached a predetermined level. Specifically, the output value of the buffer BFa2 drops in keeping with the quantity of light received by the monitor sensor MSa. When the output value exceeds the reference value Vref, the output of the comparator CPa is inverted. The comparator output effected at this point is one which is inverted the moment the integrated quantity of light received by the monitor sensor MSa reaches a level corresponding to the reference value Vref. The output of the comparator CPa is connected to one of two selector terminals of the switch SWa, to be discussed later.

The dummy comparator signal generator TG3a generates a signal (dummy signal) equivalent to the signal output by the comparator CPa representing the result of the comparison. In this embodiment, the dummy comparator signal generator TG3a generates a dummy signal equivalent to the signal output by the comparator CPa when the buffer output exceeds the reference value Vref. The output of the dummy comparator signal generator TG3a is connected to the other selector terminal of the switch SWa, to be discussed later.

The switch SWa acts to switch between the output a2 from the comparator CPa and the output a5 from the dummy comparator signal generator TG3a, in accordance with predetermined control signals. The common terminal a3 of the switch SWa is connected to the integration signal generator TG1a. Two kinds of control signals may be input to the switch SWa: the signal for effecting integral control in a normal illumination state, and the signal for checking the sections (e.g., integration signal generator TG1a) downstream of the switch SWa for performance.

When the signal for effecting integral control in the normal illumination state is input to the switch SWa, the switch SWa connects to one of its selector terminals which admits the output a2 from the comparator CPa. When the signal for checking the downstream circuits for performance is input to the switch SWa, the switch SWa connects to the other selector terminal which receives the output a5 from the dummy comparator signal generator TG3a.

The integration signal generator TG1a is a timing generator that generates a signal indicating an end of the integration of the quantities of light being received by the monitor sensor MSa in accordance with the signal sent from the common terminal a3 of the switch SWa. That is, the integration signal generator TG1a outputs the signal indicating the end of the integration of the quantities of light incident on the monitor sensor MSa, in response to either the output signal from the comparator CPa sent via the switch SWa or the output signal from the dummy comparator signal generator TG3a. The output of the integration signal generator TG1a is connected to an integration signal holding section TG6.

The integration signal holding section TG6 admits three signals from the integration signal generators TG1a, TG1b and TG1c of the three light quantity detection circuit groups. Specifically, the integration signal holding section TG6 holds timings of the signals generated by the integration signal generators TG1a, TG1b and TG1c of the respective light quantity detection circuit groups as indicative of their integrating processes having ended. As such, the integration signal holding section TG6 is a timing generator that outputs digital signals in keeping with the retained timings of the signals from the light quantity detection circuit groups.

In addition to the component sections structured as described above, the light quantity detecting apparatus of this embodiment includes a decoder DCD and switch pulse generators TG4 and TG5. The decoder DCD generates control signals destined for the relevant sections in accordance with an externally input digital signal (control code). The control signals output by the decoder DCD are forwarded to the dummy comparator signal generators TG3a, TG3b and TG3c as well as to the switch pulse generators TG4 and TG5.

The switch pulse generator TG4 is a timing generator that generates changeover signals destined for switches of the light quantity detection circuit groups SWa, SWb and SWc in accordance with the control signals coming from the decoder DCD. The switch pulse generator TG5 is a timing generator that generates a changeover signal destined for a switch SWd in keeping with the control signals from the decoder DCD. The switch SWd serves to switch from output to another from a plurality of AF sensors Sa, Sb and Sc.

[Control Codes]

The decoder DCD admits inputs CLK, STB, SD1, and SD2. The inputs SD1 and SD2 each have a control code placed therein. The input CLK is a clock signal and STB is a control code latch signal. FIG. 2 is a schematic view explanatory of input timings of the control codes. The three signals STB, SD1 and SD2 are used to input a four-bit (D1-D4) control code to the decoder DCD. More specifically, at a point in time at which the signal STB goes from high to low, the code of SD1 is defined as D1 and the code of SD2 as D2. At a point in time at which the signal STB goes from low to high, the code of SD1 is defined as D3 and the code of D2 as D4. The four-bit control codes in which D1 through D4 are thus defined is input to the decoder.

FIG. 3 is a tabular view listing typical control codes. For this embodiment, relevant functions are defined corresponding to the control codes in four bits D1 through D4 and numbered from 1 to 11 as indicated. When a given control code is input to the decoder, the decoder generates a corresponding control signal for triggering the function defined by the input control code, and sends the generated control signal to the relevant section.

<2. Automatic Integration End Timing Notification Function>

The automatic integration end timing notification function is represented by digital signals DO1 and DO2 output by the integration signal holding section. This is a function of notifying the time at which the integrated quantities of light received by each of the configured monitor sensor have reached a predetermined level. The notification is output in keeping with the timings of the signals held by the integration signal holding section. The notification triggers verification of the operation timings of the integration signal generators in the respective light quantity detection circuit groups.

FIG. 4 is a timing chart explanatory of the automatic integration end timing notification function. An automatic integration start command formed by the above-described control codes first causes all three monitor sensors to start receiving light. The integrating processes are thus started.

With the integration started, the signal DO2 goes from high to low and thereby gives notification that the integrating processes have begun. Checks are made, at intervals of predetermined clock pulses (e.g., 32 clock pulses), to determine if any one of the three monitor sensors has terminated its integrating process upon reaching a predetermined level of the integrated quantities of incident light.

Upon completion of the integrating process by one of the monitor sensors and upon elapse of the next clock pulse interval (e.g., 32 clock pulses later), the signal DO1 goes low for a predetermined number of clock pulses (e.g., 16 clock pulses). This gives notification of the point in time at which the integration has ended.

In the example of FIG. 4, upon completion of the integration by the monitor sensor MSa, a first notification is made at the 64th clock pulse (i.e., 32×2). A second notification is effected at the 160th clock pulse (32×5) upon completion of the integration by the monitor sensor MSb. A third notification is given at the 256th clock pulse (32×8) upon completion of the integration by the monitor sensor MSc.

When the integrating processes by all monitor sensors are complete, the signal DO2 goes high at the same time as the last signal DO1 goes high. This gives notification that the integrating processes of all monitor sensors have come to an end.

<3. Automatic Integration End Sequence Information Notification Function>

The automatic integration end sequence information notification function is represented by the digital signals DO1 and DO2 output by the integration signal holding section. This is a function of notifying the sequence in which the integrated quantities of light received by each of the configured monitor sensors have reached the predetermined level. The notification is output in keeping with the timings of the signals held by the integration signal holding section. The notification triggers verification of the sequence in which the integration signal generators in the respective light quantity detection circuit groups operate.

FIG. 5 is a timing chart explanatory of the automatic integration end sequence information notification function. First, an integration end sequence information readout command formed by the above-described control codes is used to give notification of integration end sequence information.

Specifically, when the control code denoting the integration end sequence information readout command is input to the decoder, the decoder sends a corresponding control signal representative of the input control code to the integration signal holding section. Upon receipt of the control signal, the integration signal holding section outputs six pulses from its DO1 terminal.

The first and the second pulses constitute information for the monitor sensor MSa; the third and the fourth pulses make up information for the monitor sensor MSb; and the fifth and the sixth pulses form information for the monitor sensor MSc. The signal DO2 outputs an end sequence code in accordance with the six pulses.

FIG. 6 is a tabular view listing typical end sequence codes. In this table of end sequence codes, the outputs (1) and (2) in the signal DO2 correspond to the outputs (1) and (2) in the signal DO1 shown in the timing chart of FIG. 5. That is, the outputs (1) and (2) in the signal DO2 denote the sequence in which the monitor sensors have ended their integrating processes.

For example, if the monitor sensor MSa is the first to end its integrating process, the monitor sensor MSb is the second to end its integration and the monitor sensor MSc is the third to do so, then the output code in the signal DO2 is "0, 0" (information for the monitor sensor MSa), "1, 0" (information for the monitor sensor MSb), and "0, 1" (information for the monitor sensor MSc).

<4. Automatic Integration End Control>

[Control in Normal State]

Figure 7:
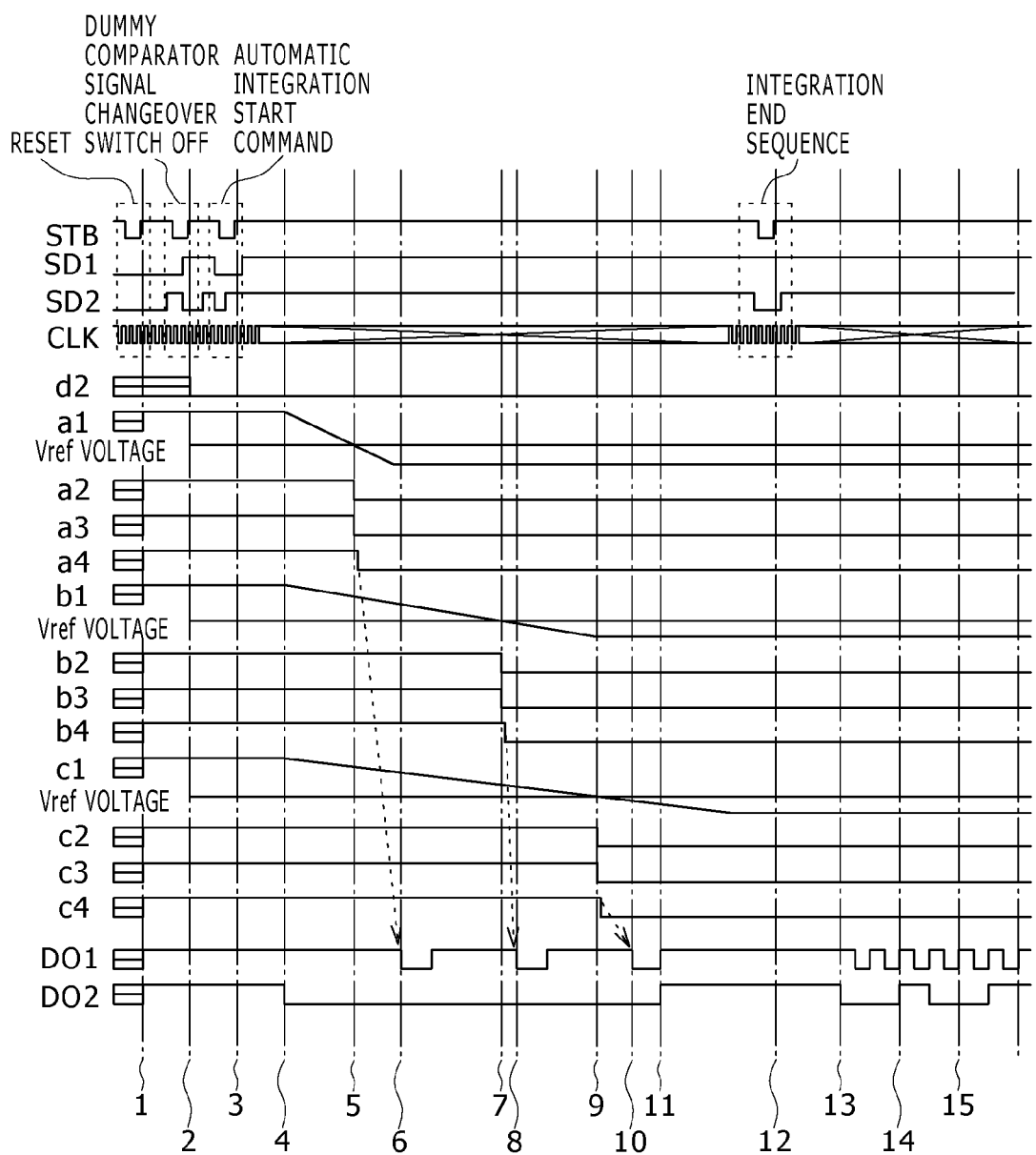
FIG. 7 is a timing chart explanatory of automatic integration end control over AF sensors in a normal state (i.e., in a normal imaging state)

FIG. 7 is a timing chart explanatory of automatic integration end control over the AF sensors in a normal state (i.e., in a normal imaging state). What takes place under automatic integration end control will be described below in order of the timings involved. Of the reference characters used in the ensuing description, those not found in FIG. 7 can be referred to in FIG. 1.

1. Reset Command

Before the start of incident light integration by the monitor sensors, a reset command is issued to initialize the logical circuits. The control signals are made up of four digital inputs CLK, STB, SD1 and SD2 (see the typical control code inputs in FIG. 3 and the table of control codes in FIG. 3). The signal CLK serves as a basic clock signal for each of the timing generators TG and for the decoder.

As shown in FIG. 2, the timings of three pulses STB, SD1 and SD2 are combined to define four-bit control codes. The reset command is input using the pulse timing combination No. 1 in FIG. 3, with "0" set for D1, "0" for D2, "0" for D3, and "0" for D4.

2. Dummy Comparator Signal Changeover Switch Off Command

A dummy comparator signal changeover switch OFF command is used to set a normal automatic integration end mode for automatic integration control in keeping with the output of the monitor sensors MSa, MSb and MSc. The control codes are converted by the decoder DCD. At the switch pulse generator TG4, a switch control signal (d2) goes low causing the switches SWa, SWb and SWc to connect to the comparators CPa, CPb and CPc.

3. Automatic Integration Start Command

An automatic integration start command is used to start the integrating processes of all monitor sensors simultaneously.

4. Integration Start

An automatic integration start command is converted by the decoder DCD signaling the integration signal generators to control the start of integration of the monitor sensors MSa, MSb and MSc (i.e., monitor sensors MSa, MSb and MSc are controlled by the integration signal generators TG1$a$, TG1$b$ and TG1$c$, respectively). The integration signal generators generate an integration start pulse each. The pulse signals cause the AF sensors Sa, Sb and Sc to start their integrating processes at the same time as the monitor sensors MSa, MSb and MSc. The signal DO2 is then brought low giving notification that integration has started.

5. Automatic Integration End of the Monitor Sensor MSa

Notification is made of the automatic integration end of the monitor sensor MSa when the output (a1) of the monitor sensor MSa, upon exceeding a predetermined voltage (Vref) during monitoring by the comparator CPa, causes the latter to invert its output (a2). The output (a2) of the comparator CPa is then input to the input terminal (a3) of the integration signal generator TG1 which in turn generates an integration end pulse for the AF sensor Sa.

For this embodiment, it is assumed that a maximum quantity of light is incident on the monitor sensor MSa, a medium quantity of light on the monitor sensor MSb, and a minimum quantity of light on the monitor sensor MSc. It follows that the monitor sensor MSa receiving the largest quantity of light is the first to end its integrating process.

6. Automatic Integration End Timing Notification of the First Monitor Sensor

Information about the monitor sensor MSa having ended its automatic integration is output (a4) by the integration signal generator TG1$a$ and input to the integration signal holding section TG6. Upon taking the input signal as the timing of an automatic integration end, the integration signal holding section TG6 sends a pulse to DO1. These operations combine to give notification of the first automatic integration end timing.

7. Automatic Integration End of the Monitor Sensor MSb

The monitor sensor MSb receiving the medium quantity of light terminates its automatic integration in the same manner as in the case of the timing of 5 above.

8. Automatic Integration End Timing Notification of the Second Sensor

At the end of the automatic integration of the monitor sensor MSb, notification is made of the second automatic integration end timing in the same manner as in the case of the timing of 6 above.

9. Automatic Integration End of the Monitor Sensor MSc

The monitor sensor MSc receiving the minimum quantity of light terminates its automatic integration in the same manner as in the case of the timing of 5 above.

10. Automatic Integration End Timing Notification of the Third Sensor

At the end of the automatic integration of the monitor sensor MSc, notification is made of the third automatic integration end timing in the same manner as in the case of the timing of 6 above.

11. Automatic Integration End Timing Notification Complete

The end of the automatic integration of the monitor sensor MSc signals the completion of the integrating processes of all three monitor sensors. This causes the signal DO2 to go high at the same leading edge as that of the last DO1. Notification is thus made of the completion of the integrating processes regarding all monitor sensors.

12. Integration End Sequence Information Readout Command

The control code representative of an integration end sequence information readout command is converted by the decoder DCD. The integration signal holding section TG6 then gives notification of the integration end sequence information using DO1 and DO2.

13. End Sequence Information Notification of the Monitor Sensor MSa

The first and the second pulses in the signal DO1 of which the notification is made by the integration end sequence information readout command provide the timing for notification of the end sequence information about the monitor sensor MSa. As shown in the table of sequence codes in FIG. 6, a first DO2 value of "0" and a second DO2 value of "0" in the signal DO1 give notification that the end sequence of the monitor sensor MSa comes first.

14. End Sequence Information Notification of the Monitor Sensor MSb

The third and the fourth pulses in the signal DO1 of which the notification is made by the integration end sequence information readout command provide the timing for notification of the end sequence information about the monitor sensor MSb. As shown in the table of sequence codes in FIG. 6, a third DO2 value of "1" and a fourth DO2 value of "0" in the signal DO1 give notification that the end sequence of the monitor sensor MSb comes second.

15. End Sequence Information Notification of the Monitor Sensor MSc

The fifth and the sixth pulses in the signal DO1 of which the notification is made by the integration end sequence information readout command provide the timing for notification of the end sequence information about the monitor sensor MSc. As shown in the table of sequence codes in FIG. 6, a fifth DO2 value of "0" and a sixth DO2 value of "1" in the signal DO1 give notification that the end sequence of the monitor sensor MSc comes third.

[Control During Testing]

Figure 8:
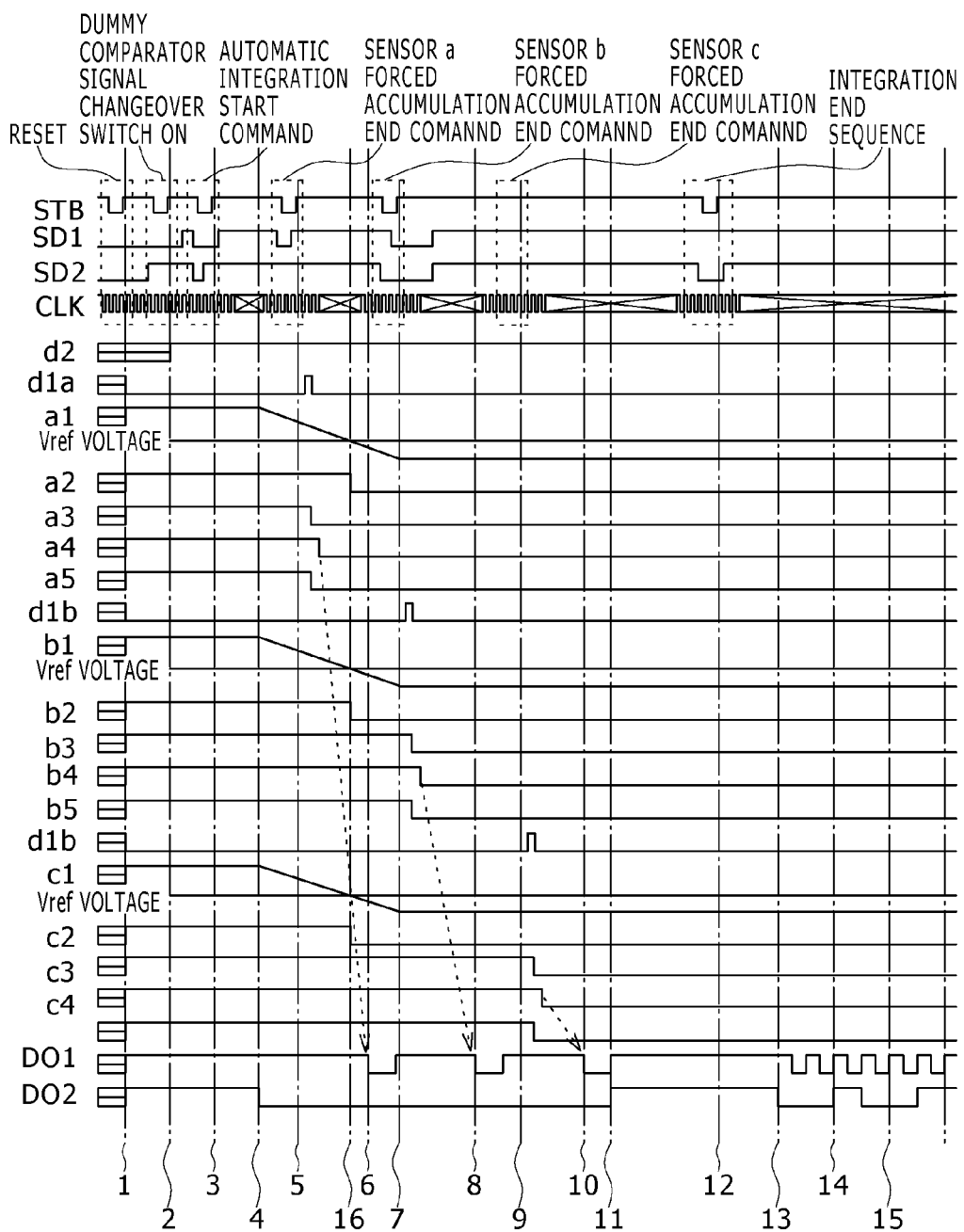
FIG. 8 is a timing chart explanatory of automatic integration end control over AF sensors during testing.

FIG. 8 is a timing chart explanatory of automatic integration end control over the AF sensors during testing. What takes place under automatic integration end control will be described below in order of the timings involved. Of the reference characters used in the ensuing description, those not found in FIG. 8 can be referred to in FIG. 1.

1. Reset Command

Before the start of incident light integration by the monitor sensors, a reset command is issued to initialize the logical circuits. The control signals are made up of four digital inputs CLK, STB, SD1 and SD2 (see the typical control code inputs in FIG. 3 and the table of control codes in FIG. 3). The signal CLK serves as a basic clock signal for each of the timing generators TG and for the decoder.

As shown in FIG. 2, the timings of three pulses STB, SD1 and SD2 are combined to define four-bit control codes. The reset command is input using the pulse timing combination No. 1 in FIG. 3, with "0" set for D1, "0" for D2, "0" for D3, and "0" for D4.

2. Dummy Comparator Signal Changeover Switch ON Command

A dummy comparator signal changeover switch ON command is used to set a mode in which to control directly the comparator outputs using control codes from the outside, as opposed to the mode for control over the comparator outputs in accordance with signals representative of the monitor sensor outputs. The control codes are converted by the decoder DCD. At the switch pulse generator TG4, a switch control signal (d2) goes high causing the switches SWa, SWb and SWc to connect to the dummy comparator signal generators TG3a, TG3b and TG3c.

3. Automatic Integration Start Command

An automatic integration start command is used to start the integrating processes of all monitor sensors simultaneously.

4. Integration Start

The integrating processes are started in the same manner as under normal automatic integration end control.

5. Forced Integration End Command for the Monitor Sensor MSa

A forced integration end command for the monitor sensor MSa is converted by the decoder causing the dummy comparator signal generator TG3a to generate a dummy comparator signal (a5). Whereas the output a5 of the dummy comparator signal generator TG3a was initialized high by the reset signal, the forced integration end command causes the generator output a5 to go low. Since the switch SWa is being set to the dummy comparator signal generator TG3a, the low signal is input to the input terminal (a3) of the integration signal generator TG1a. In this manner, the integration end of the monitor sensor MSa is forcibly controlled from the outside.

6. Automatic Integration End Notification of the First Sensor

When the output (a4) of the integration signal generator TG1a is input to the integration signal holding section TG6, notification is made of the automatic integration end regarding the first monitor sensor.

7. Forced Integration End Command for the Monitor Sensor MSb

The integration end of the monitor sensor MSb is forcibly controlled from the outside in the same manner as in the case of the timing of 5 above.

8. Automatic Integration End Notification of the Second Sensor

At the forced integration end of the monitor sensor MSb, notification is made of the automatic integration end regarding the second monitor sensor in the same manner as in the case of the timing of 6 above.

9. Forced Integration End Command for the Monitor Sensor MSc

The integration end of the monitor sensor MSc is forcibly controlled from the outside in the same manner as in the case of the timing of 5 above.

10. Automatic Integration End Notification of the Second Sensor

At the forced integration end of the monitor sensor MSc, notification is made of the automatic integration end regarding the third monitor sensor in the same manner as in the case of the timing of 6 above.

11. Automatic Integration End Timing Notification Complete

An integration end of the monitor sensor MSc signals the completion of the integrating processes of all three monitor sensors. Notification is thus made of the completion of the integrating processes regarding all monitor sensors MSa, MSb and MSc.

12. An integration end sequence information readout command (timing No. 12), an end sequence information notification of the monitor sensor MSa (timing No. 13), an end sequence information notification of the monitor sensor MSb (timing No. 14), and an end sequence information notification of the monitor sensor MSc (timing No. 15) are all effected in the same manner as under normal automatic integration end control.

In normal operation, as described above, the integrating processes are terminated sequentially in an order reflecting the quantities of light incident on each of the sensors configured. Where the circuits downstream of the comparators are to be checked for performance, the appropriate control codes are used along with the timing generators TG so as to control forcibly the comparator signals from the outside. This setup makes it possible to set the integration end timings as desired regardless of the quantities of incident light.

The automatic integration end timing notification is held by the integration signal holding section TG6. It follows that by referencing the signals DO1 and DO2 output by the integration signal holding section TG6, it is possible to check the performance of the circuits downstream of the switches SWa, SWb and SWc. In other words, if the integration end timing notifications defined by DO1 and DO2 are found to coincide with the timings of the control signals sent by the decoder DCD to the dummy comparator signal generators TG3a, TG3b and TG3c, that means the circuits downstream of the switches SWa, SWb and SWc operate normally. On the other hand, if the integration end timing notifications defined by DO1 and DO2 fail to coincide with the timings of the control signals forwarded by the decoder DCD to the dummy comparator signal generators TG3a, TG3b and TG3c, that means the circuits downstream of the switches SWa, SWb and SWc do not operate normally.

<5. Imaging Apparatus>

Figure 9:
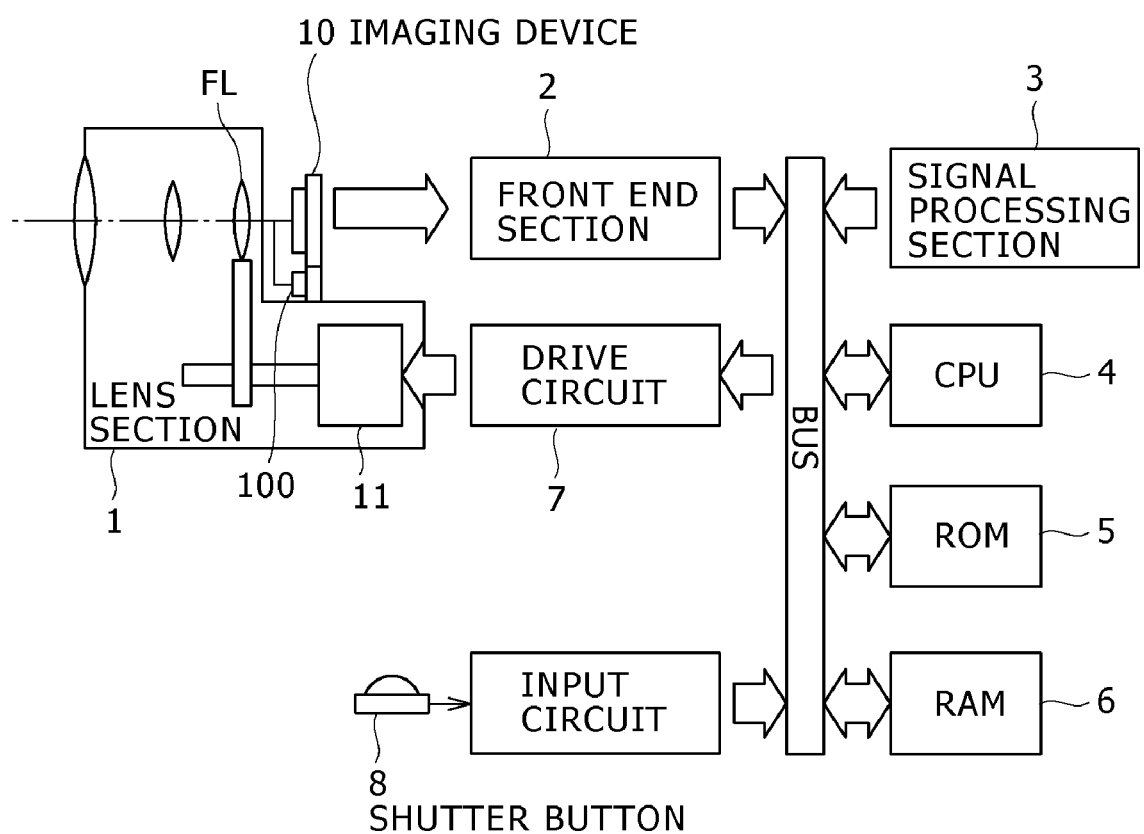
FIG. 9 is a block diagram showing a typical structure of a digital still camera representative of an imaging apparatus practiced as another embodiment of the present invention.

FIG. 9 is a block diagram showing a typical structure of a digital still camera representative of an imaging apparatus practiced as another embodiment of the present invention. This digital still camera is primarily made up of a lens section 1 that has an object imaged by an imaging device 10; the imaging device 10 that converts the image thus formed into electrical signals; a front end section 2 that converts the electrical signals to digital signals; a signal processing section 3, a CPU 4, a ROM 5 and a RAM 6 which carry out signal processing on image signals; and a drive circuit 7 that drives a focusing lens drive mechanism 11 inside the lens section 1.

The lens section 1 includes a focusing lens FL and the focusing lens drive mechanism 11 that drives the focusing lens FL. Under instructions from the CPU 4, the drive circuit 7 gives signals to the focusing lens drive mechanism 11. The signals cause the mechanism 11 to move the focusing lens along the optical axis to focus an image onto the light-receiving plane of the imaging device 10. When implementing its focusing function, this embodiment utilizes the light quantity detecting apparatus of the invention in the form of an autofocus sensor arrangement 100.

Upon focusing, the above-described automatic integration end control is effected in the normal state. Specifically, displacements between images incident on a pair of AF sensors are detected. Calculations are then made to drive the focusing lens FL in such a manner as to remove the displacements. At this point, the monitor sensors installed near the AF sensors effect automatic integration end control.

Figure 10:
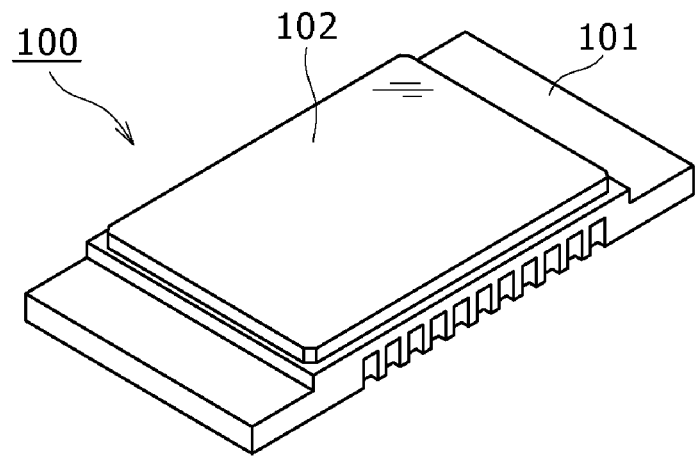
FIG. 10 is an external perspective view of an autofocus sensor arrangement incorporating the light quantity detecting apparatus of the invention.

FIG. 10 is an external perspective view of the autofocus sensor arrangement 100 incorporating the light quantity detecting apparatus of the invention. A package 101 of the autofocus sensor arrangement 100 contains the components shown in FIG. 1, i.e., the AF sensors, monitor sensors for light quantity detection, timing generators, and decoder. A transparent cover 102 is provided over the AF sensors and monitor sensors. Light enters the sensors through the cover 102.

Figure 11:
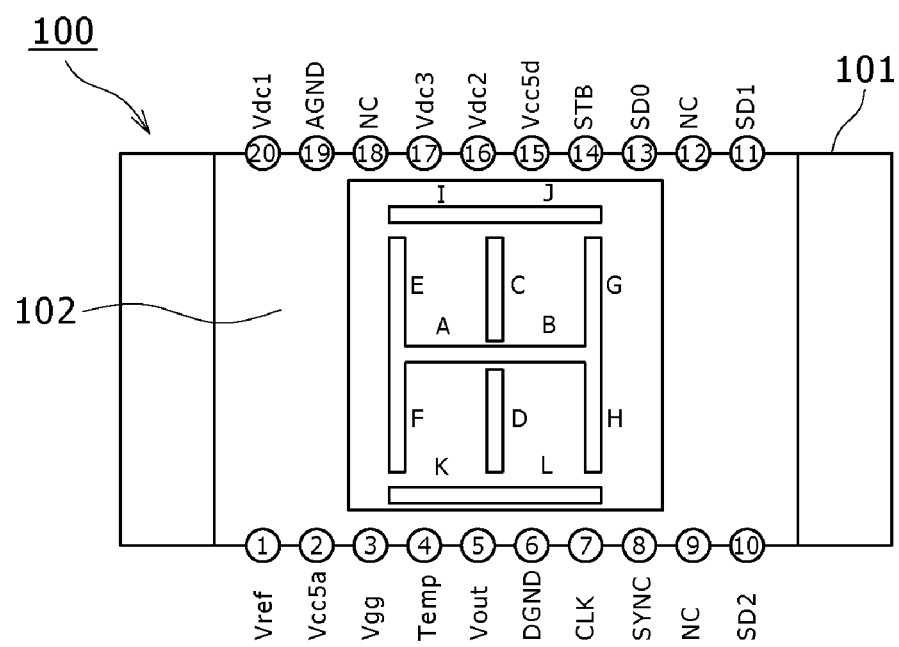
FIG. 11 is a schematic plan view showing a typical layout of AF sensors in the autofocus sensor arrangement.

FIG. 11 is a schematic plan view showing a typical layout of the AF sensors in the autofocus sensor arrangement 100. The package 101 of the autofocus sensor arrangement 100 is encircled by terminals for the supply of power, for grounding, and for input and output of various signals. Under the cover 102 are a plurality of AF sensors laid out in a suitable pattern. In the example of FIG. 11, a total of 12 AF sensors indicated by reference characters A through L constitute the pattern of a cross placed in a rectangular box. Of the 12 AF sensors, the sensor A is paired with the sensor B, sensor C with sensor D, sensor E with sensor F, sensor G with sensor H, sensor I with sensor J, and sensor K with sensor L. Displacements between images incident on each pair of AF sensors are detected and calculations are made to eliminate the displacements for focusing purposes.

Figure 12:
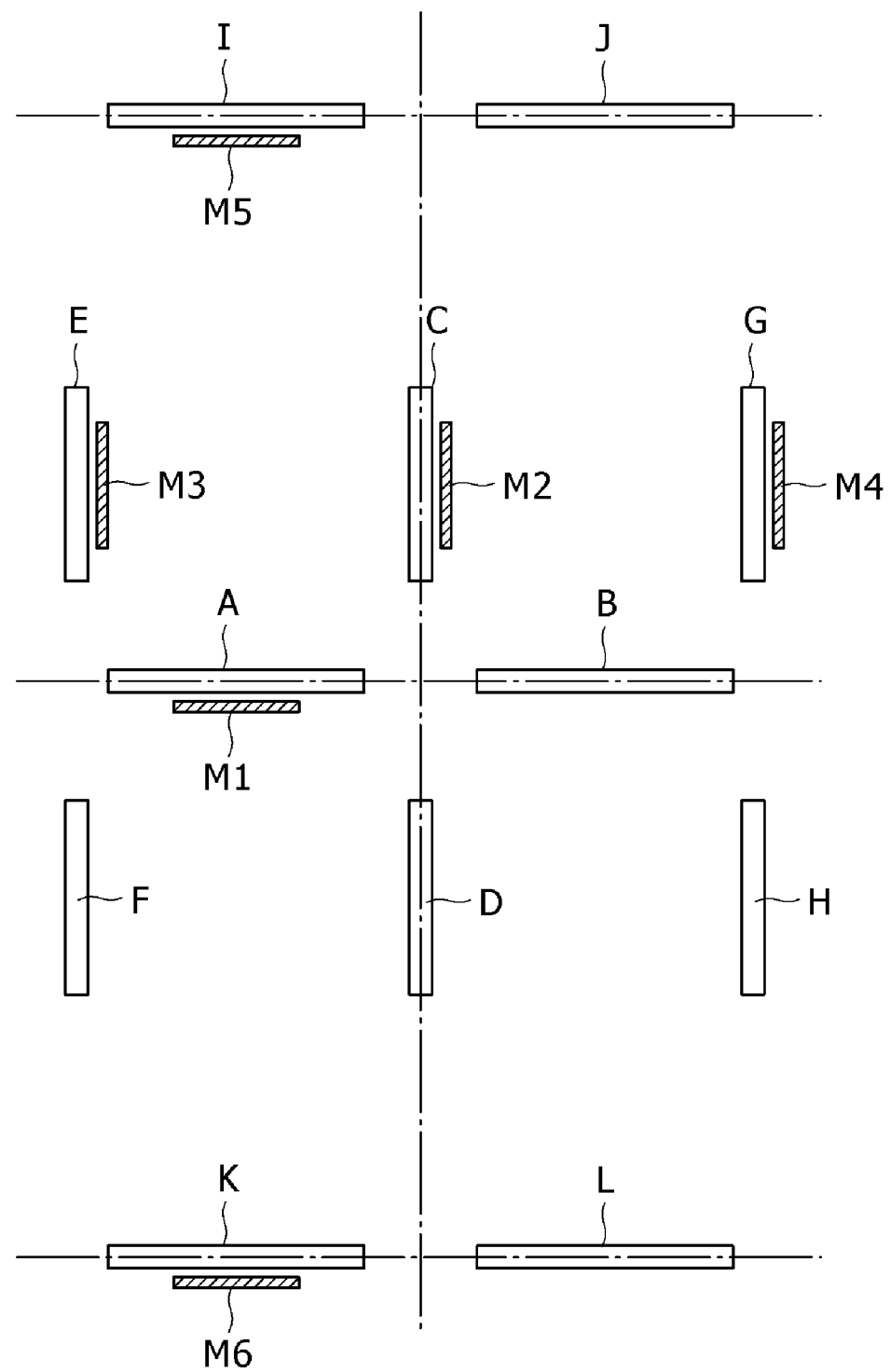
FIG. 12 is a schematic view showing a typical layout of AF sensors and monitor sensor.

FIG. 12 is a schematic view showing a typical layout of the AF sensors and monitor sensors. In this example, a monitor sensor M1 is positioned near the AF sensor A paired with the AF sensor B; a monitor sensor M2 is positioned near the AF sensor C paired with the AF sensor D; a monitor sensor M3 is positioned near the AF sensor E paired with the AF sensor F; a monitor sensor M4 is positioned near the AF sensor G paired with the AF sensor H; a monitor sensor M5 is positioned near the AF sensor I paired with the AF sensor J; and a monitor sensor M6 is positioned near the AF sensor K paired with the AF sensor L.

These monitor sensors M1 through M6 are used in combination to effect automatic integration end control over the AF sensors. Any one of the monitor sensors shown in FIG. 1 corresponds to any one of the monitor sensors indicated in FIG. 12. The example of FIG. 12 is constituted by six sets of the monitor sensors and light quantity detection circuit groups shown in FIG. 6.

The number of AF sensors and that of monitor sensors as well as their layout are not limited to those shown in FIGS. 11 and 12. The AF sensors and monitors may vary in terms of numbers and layouts.

6. Effects of the Embodiments

According the preferred embodiments of the present invention, where sorting equipment emits a constant level of light to a plurality of monitor sensors on a single chip without varying the intensity of illumination, dummy comparator signals can be controlled externally to check the monitor sensors for their automatic integration end timing notification and end sequence notification functions. When the light quantity detecting apparatus of the invention is applied to the autofocus sensor arrangement and incorporated in the imaging apparatus, a plurality of monitor sensors and downstream circuits in the arrangement can be checked for performance even after these components have been built into the imaging apparatus.

It should be understood by those skilled in the art that various modifications, combinations, sub-combinations and alterations may occur depending on design requirements and other factor in so far as they are within the scope of the appended claims or the equivalents thereof.

What is claimed is:

1. A light quantity detecting apparatus comprising:
   an integration detection section configured to output a signal that varies with integrated quantities of light received by a light-receiving device;
   a comparison section configured to compare the signal output by said integration detection section with a reference value in order to output a signal representing a result of the comparison;
   a dummy signal generation section configured to generate a signal equivalent to the comparison result signal output by said comparison section;
   a changeover section configured to switch between the output of said comparison section and the signal generated by said dummy signal generation section in response to a control signal; and
   an integration signal generation section configured to (a) receive the signal from the comparison section and the signal from the dummy signal generation section as determined by the changeover section and (b) generate a signal indicating an end of the integration of the quantities of received light in response to the signal received from the changeover section.

2. The light quantity detecting apparatus according to claim 1, further comprising a plurality of light quantity detection circuit groups each including said integration detection section, said comparison section, said dummy signal generation section, said changeover section, and said integration signal generation section; and a control signal generation section configured to generate said control signal for each of said light quantity detection circuit groups in a predetermined sequence.

3. The light quantity detecting apparatus according to claim 1, further comprising an integration signal holding section configured to hold timings of the signal generated by said integration signal generation section.

4. The light quantity detecting apparatus according to claim 1, wherein said control signal is used to check the sections downstream of said changeover section for performance.

5. An imaging apparatus comprising:
   an autofocus sensor configured to be used for automatically focusing a lens arrangement; and
   a light quantity detection section configured to detect the quantity of light received near said autofocus sensor;
   wherein said light quantity detection section includes:
      an integration detection section configured to output a signal that varies with integrated quantities of light received by a light-receiving device;
      a comparison section configured to compare the signal output by said integration detection section with a reference value in order to output a signal representing a result of the comparison;
      a dummy signal generation section configured to generate a signal equivalent to the comparison result signal output by said comparison section;
      a changeover section configured to switch between the output of said comparison section and the signal generated by said dummy signal generation section in response to a control signal; and
      an integration signal generation section configured to (a) receive the signal from the comparison section and the signal from the dummy signal generation section as determined by the changeover section and (b) generate a signal indicating an end of the integration of the quantities of received light in response to the signal received from the changeover section.

6. A light quantity detecting apparatus comprising:
   integration detection means for outputting a signal that varies with integrated quantities of light received by a light-receiving device;
   comparison means for comparing the signal output by said integration detection means with a reference value in order to output a signal representing a result of the comparison;
   dummy signal generation means for generating a signal equivalent to the comparison result signal output by said comparison means;
   changeover means for switching between the output of said comparison means and the signal generated by said dummy signal generation means in response to a control signal; and
   integration signal generation means for receiving the signal from the comparison section and the signal from the dummy signal generation section as determined by the changeover section and generating a signal indicating an end of the integration of the quantities of received light in response to the signal received from the changeover section.

* * * * *